Patented Apr. 17, 1928.

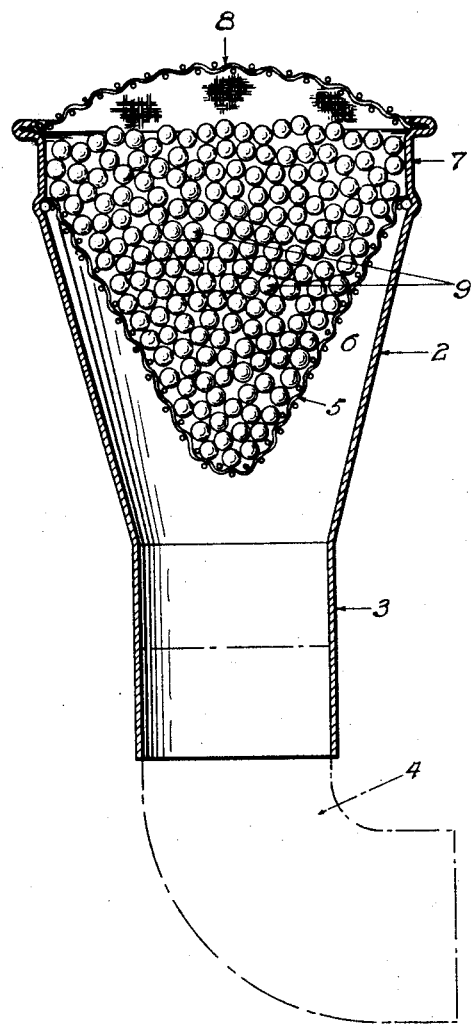

1,666,257

UNITED STATES PATENT OFFICE.

WILLIAM HENRY GRAHAM FURNIVALL, DAVID BERTHA McLAREN, AND EDGAR JACOB LASCHINGER, OF JOHANNESBURG, TRANSVAAL, SOUTH AFRICA.

EXHAUST SILENCER.

Application filed September 17, 1925. Serial No. 56,830.

This invention has reference to exhaust silencers in which the noise and pulsations of the exhaust gases are suppressed by passing the gases through a loose mass of balls.

The purpose of the invention is to provide an effective silencer which is small and light relatively to its capacity and which produces low back pressure in the exhaust pipe.

The invention is illustrated in the accompanying drawing, which is an elevation partly sectioned.

2 is a conical casing having its smaller end formed at 3 as an inlet for connection to the exhaust pipe 4 of an engine or the like.

Within the casing is a conical screen 5 preferably made of wire so as to provide free passage for the gases through it. Its upper and larger end is seated in the casing 2 and its smaller end is directed towards the inlet 3. The conical angle of the screen is more obtuse than that of the casing so as to provide an annular upwardly tapering passage 6 in continuation of the inlet 3. The casing 2 is continued upwardly for a short distance above the seating of the screen 5, preferably as a cylinder 7.

The top of the silencer is covered in by another screen 8, and between the screens is a mass of balls 9. The exhaust gases pass through the screen 5 and the mass of balls 9, and are discharged to atmosphere through the screen 8. The conical form of the screen 5 gives it an area for the passage of gas very much greater than the area of the exhaust pipe, minimizing the resistance to flow and reducing the back pressure in the engine.

The balls 9 incompletely fill the space between the screens so that they are free for individual movement by the gases. The passage of the gas through the mass of balls lifts and opens out the same; and provided the size and quality of the balls are chosen to suit the volume and velocity of the exhaust gases, the balls float and are constantly agitated by the gas. Thereby they absorb the greater part of the kinetic energy of the gas, which passes away without objectionable noise, whilst the constant agitation keeps the balls clean and prevents their becoming packed into a compact mass. The balls are preferably made of material specially resistant to abrasion such as hard steel alloy. For most automobile engines it has been found appropriate to use balls five thirty-seconds of an inch in diameter and to make the axial depth of the mass of balls about four inches. Aeroplane engines, having an exhaust of greater volume, higher velocity and greater continuity, would require a greater depth of the mass and heavier individual balls.

The depth of the mass of balls is greatest in the line of the axis of the silencer where the exhaust gases tend to flow with the greatest velocity and in a direct line to the atmosphere. Said depth diminishes away from the axis conformably with the diminished velocity and pressure of the flowing gas. At the periphery a sufficient depth is maintained by the cylindrical part 7 of the casing.

We claim:—

1. An exhaust silencer comprising a casing having an imperforate upper portion of substantially uniform section and a lower downwardly tapered portion and formed with an inlet at its smaller end, a cover screen above the upper portion and a downwardly tapered screen extending below said upper portion and a loose mass of hardened steel balls which when quiescent, occupies the space within the downwardly tapered screen and the uniform section of the casing but incompletely fills the space between the screens.

2. An exhaust silencer comprising a conical casing, an inlet at its smaller end, a conical screen of greater vertical angle disposed within the casing with its smaller end towards the inlet whereby an annular tapering chamber is formed between the screen and the casing, a cover screen for the casing and hardened steel balls incompletely filling the space between the screens.

Signed by the said WILLIAM HENRY GRAHAM FURNIVALL and DAVID BERTHA McLAREN at Johannesburg, Transvaal Province, Union of South Africa, this 29th day of July, 1925.

WILLIAM HENRY GRAHAM FURNIVALL.
DAVID BERTHA McLAREN.

Signed by the said EDGAR JACOB LASCHINGER at Johannesburg, Transvaal Province, Union of South Africa, this fifth day of Aug., 1925.

E. J. LASCHINGER.